(12) United States Patent
Sidener et al.

(10) Patent No.: US 11,900,223 B2
(45) Date of Patent: Feb. 13, 2024

(54) DEVICE AND METHOD FOR MONITORING A SYSTEM

(71) Applicant: Westinghouse Electric Company LLC, Cranberry Township, PA (US)

(72) Inventors: Scott Edward Sidener, Lexington, SC (US); Clarence Lee Worrell, Wexford, PA (US); Whitney Bopp Sintic, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 654 days.

(21) Appl. No.: 16/722,845

(22) Filed: Dec. 20, 2019

(65) Prior Publication Data

US 2021/0192384 A1    Jun. 24, 2021

(51) Int. Cl.
| | |
|---|---|
| G06N 20/00 | (2019.01) |
| G06N 5/04 | (2023.01) |
| G05B 19/425 | (2006.01) |
| G05B 23/02 | (2006.01) |
| G01M 13/045 | (2019.01) |

(52) U.S. Cl.
CPC ........... G06N 20/00 (2019.01); G05B 19/425 (2013.01); G05B 23/0221 (2013.01); G06N 5/04 (2013.01); *G01M 13/045* (2013.01)

(58) Field of Classification Search
None
See application file for complete search history.

(56) References Cited

U.S. PATENT DOCUMENTS

| | | | |
|---|---|---|---|
| 2010/0305721 A1* | 12/2010 | Kostadinov | G05B 19/0426 700/86 |
| 2012/0191236 A1* | 7/2012 | Ausschnitt | G03F 7/705 700/105 |
| 2018/0281256 A1 | 10/2018 | Asaoka et al. | |
| 2019/0384255 A1 | 12/2019 | Krishnaswamy et al. | |

OTHER PUBLICATIONS

Narendra, Kumpati S., Jevendran Balakrishnan, and M. Kemal Ciliz. "Adaptation and learning using multiple models, switching, and tuning." IEEE control systems magazine 15.3 (1995): 37-51. (Year: 1995).*

(Continued)

*Primary Examiner* — Carlos R Ortiz Rodriguez
(74) *Attorney, Agent, or Firm* — K&L Gates LLP (57) ABSTRACT

A portable real-time system monitoring device is advantageously capable of autonomously learning the normal behavior of any system and of alerting the user or taking other action when the system becomes unpredictable or otherwise undesirable. No prior knowledge about the system is needed by the device. This is because the device uses a combination of machine learning and statistical process control to autonomously develop its own model of the monitored system and then autonomously monitor the system for unexpected behavior. Therefore, without any prior analysis or model creation, it can be deployed on any system, and it can be reused on any other system after it has been reset. The advantageous device of the disclosed and claimed concept performs this function in either real time or near real-time.

20 Claims, 5 Drawing Sheets

(56) References Cited

OTHER PUBLICATIONS

Van Laerhoven, Kristof, Kofi Asante Aidoo, and Steven Lowette. "Real-time analysis of data from many sensors with neural networks." Proceedings fifth international symposium on wearable computers. IEEE, 2001. (Year: 2001).*

Bigus, Joseph P., et al. "Able: A toolkit for building multiagent autonomic systems." IBM Systems Journal 41.3 (2002): 350-371. (Year: 2002).*

Lee, Yen-Lin, Pei-Kuei Tsung, and Max Wu. "Techology trend of edge AI." 2018 International Symposium on VLSI Design, Automation and Test (VLSI-DAT). IEEE, 2018. (Year: 2018).*

Hao, Tianshu, et al. "Edge AIBench: towards comprehensive end-to-end edge computing benchmarking." International Symposium on Benchmarking, Measuring and Optimization. Springer, Cham, 2018. (Year: 2018).*

International Search Report and Written Opinion for International PCT Application No. PCT/US2020/066448, dated Apr. 6, 2021.

\* cited by examiner

DEVICE AND METHOD FOR MONITORING A SYSTEM

BACKGROUND

1. Field

The disclosed and claimed concept relates generally to monitoring equipment and, more particularly, is related to a device and a method that are configured to monitor a system on an ongoing basis and that are further configured to generate an output when the behavior of the system becomes unstable or is otherwise undesirable or unpredictable.

2. Related Art

Numerous types of systems that perform any of a variety of operations are known in the relevant art. Such systems can range in complexity from the extremely simple, such as a manually-operated double hung window, to complex, such as the engine of a racing car, etc. Depending upon the degree to which the system is critical, such as being critical to another system or being critical to the continued function of an overall operation, various degrees of monitoring and observation of the system are warranted. For instance, a pump that pumps a coolant to a nuclear reactor typically will be viewed as being more critical than a pump that delivers water to an ornamental fountain, and thus the former pump is typically going to be the subject of more monitoring and observation than the latter.

It is understood, however, that such observation and monitoring typically involve time and expense, and such observation and monitoring may further require a certain degree of expertise with regard to the system in question, which can involve further expense and may be dependent upon scarce resources, and it is possible that they system may not even be understood or comprehendible by someone with expertise. Furthermore, the criticality of a system may be based upon factors other than, for instance, potential danger to living beings and inanimate objects. For instance, a system can be considered critical and worthy of observation and monitoring if it involves meaningful expense, such as an industrial process that produces a costly product in which defects preferably would be avoided.

While numerous systems that are worthy of observation and monitoring have been observed and monitoring through, for instance, instrumentation and direct observation, the overall expense in terms of equipment, time, and scarce availability of expertise regarding these particular systems have resulted in significant overall cost and a reduced degree of observation and monitoring than would otherwise be desirable. Improvements are therefore needed.

SUMMARY

An improved portable real-time system monitoring device is advantageously capable of autonomously learning the normal behavior of any system and of alerting the user or taking other action when the system becomes unpredictable or otherwise undesirable. No prior knowledge about the system is needed by the device. This is because the device uses a combination of machine learning and statistical process control to autonomously develop its own model of the monitored system and then autonomously monitor the system for unexpected behavior. The improved monitoring device determines by itself when it is capable of predicting the behavior of the system with sufficient accuracy, and it makes its own decision as to when the monitoring device is sufficiently useful at predicting behavior of the system, and no human input is needed. Therefore, without any prior analysis or model creation, it can be deployed on any system, and it can be reused on any other system after it has been reset. The advantageous device of the disclosed and claimed concept performs this function in either real time or near real-time.

The device continuously acquires, stores, and monitors data from the system via any type of digital or analog sensor, or by digital connection to a data repository or server. Sensors on the system can be connected directly to the device of the disclosed and claimed concept, or the sensors can be wirelessly connected to the device.

As an example, the device of the disclosed and claimed concept could monitor a pump's operation, and may be particularly interested in vibration of the pump shaft. The user might connect sensors to the pump that measure shaft vibration, motor current, oil temperature, flow rate, and pressure. Once connected and turned on, the device of the disclosed and claimed concept begins autonomously learning the normal behavior of the system. It learns the normal ranges of operation, for example if the pump were to have high-speed and low-speed normal operating modes. Once the device determines that it is sufficiently trained, it begins an operational phase, monitors the pump, and sounds an alarm whenever the pump behaves unexpectedly. For example, the device might alarm when shaft vibration or bearing temperature becomes high relative to its speed of operation, which could indicate an impending failure that may not have been perceivable to the system operator. There are three categories of events that the real-time system monitoring device can detect. One is that in which the physics or internal relationships between the system inputs and outputs are changing unexpectedly. Another is when one or more inputs may be operating outside of the range of learned behavior. Still another is when something external (not seen by the sensors) is acting upon the system to make it behave in an unexpected way.

The advantageous features of the device of the disclosed and claimed concept include Autonomous System Model Development and Deployment—automatically develops its own model of the system without user input or prior knowledge of the system structure or type. Once developed, the model is automatically used to monitor the system for indications that it is behaving unpredictably. Further features include universality—the machine learning is independent of the monitored system type or architecture, such that it can be used on any conceivable system. The device is portable/embeddable and is small and facilitates installation in nearly any location or environment. Furthermore, the intrinsic methodology and hardware for the core functionality can be separated from the sensor inputs such that it could be embedded in other data collection and data acquisition systems.

For example, nuclear power plants have expressed interest in component condition monitoring, specifically for its potential to justify reducing surveillance and maintenance costs. However, operators of the plant are hesitant to make the large up-front investment of setting up a condition monitoring system, which includes instrumentation, data acquisition, data management, and analytics.

The device of the disclosed and claimed concept provides a low cost portable device that any system engineer or technician could connect to a system, which could include a component of a larger apparatus, to start monitoring and learning from its behavior. It provides opportunity for plants to sample the benefits of condition monitoring on a small scale, without the large upfront investment. It provides a low cost tool for identifying candidate systems or components that could benefit from a larger condition monitoring effort.

By way of further example, manufacturing and process-oriented facilities can similarly benefit from the low-cost monitoring and learning of a system for the purpose of statistical process control, process optimization, and defect reduction. For example, a given manufacturing facility may experience a high defect rate in a given manufacturing process, which creates significant cost due to poor quality. Production of certain products can be a complex process involving many system inputs, outputs, and relationships. The device of the disclosed and claimed concept could be applied to the manufacturing process to learn the performance and behavior of the system. Defects may be prevented by learning the precursor system behavior to creating defects and alerting the user prior to defect generation.

Another example relates to temporary systems which are set up to perform operations where there is elevated risk of unsafe conditions. Such systems can benefit from an independent real-time monitoring of the system performance. The device of the disclosed and claimed concept may provide augmented safety by learning a temporary system in near real-time and alerting and/or stopping the process when it becomes unpredictable. For instance, a temporary crane installation for lifting a heavy piece of equipment may be set up and instrumented with the device of the disclosed and claimed concept monitoring key safety aspects of the system. At any point, if the system becomes unpredictable, a halt to operations in a safe condition is automatically called and the abnormal performance can be investigated prior to it potentially leading to an unsafe condition.

Many industries are realizing large financial benefits in various applications of machine learning. Sparsity of data is what limits the nuclear industry's potential applications of machine learning. Much of the nuclear industry's data is in the form of discrete surveillance test and maintenance insights, documented in scanned hand-written reports. There is very little continuous monitoring data available. The device of the disclosed and claimed concept provides a low cost, flexible way to generate the monitoring data required to realize machine learning's benefits.

An exemplary embodiment of the disclosed and claimed device is that of a small (i.e., less than one cubic foot) physical piece of hardware that displays the real-time primary system output on a LCD touchscreen for human visual and physical interaction. The system's state of health or predictability is displayed on the screen, in addition to with audible alarms. Setup parameters are entered through this interface. The compute engine consists of a combination of microprocessors, GPUs, and microcontrollers. It includes an interface for analog and digital inputs from sensors, as well as wireless and LAN connections for data collection in lieu of direct connected sensors. Additional human interfaces may include a wireless keyboard and mouse. The device will have persistent recording of all collected data as well as the self-generated system model. This data and model can be externally downloaded for further analysis and use. The device may be powered by AC power or by battery pack.

The exemplary device that is depicted herein includes six total ports, one of them being defined as a primary port, and the balance being defined as secondary ports, it being noted that the device could have any quantity and arrangement of ports. The primary port monitors an operational parameter of the system that is of primary interest. The secondary ports measure operational parameters that may influence the operational parameter of primary interest. For example, in a pump application, a primary sensor might detect shaft vibration as being the operational parameter of primary interest, while the supporting sensors might detect operational parameters that include bearing temperature, lubricating oil level, motor current, pump suction pressure, and pump discharge flow.

Primary and secondary sensor outputs are sent at some frequency (for example 1 Hz) to a main processor of the device through a sensor interface and microcontroller. The main processor interfaces with a data management module, which manages data streaming and storage. The main processor uses a common operating system such as Linux or Windows. A display (e.g., touch screen monitor) and auxiliary user input/output (e.g., wireless mouse and keyboard) devices interface with the main processor and allow easy use and modification of the device. When the device of the disclosed and claimed concept is turned on, it reads settings from a configuration file at boot-up. The user is prompted to either select an existing model or train a new model. After initialization, the device of the disclosed and claimed concept displays its home screen, which consists of visualization of the primary parameter and its prediction quality. One example is an analog-style gauge that displays both measured and predicted values. Basic navigation buttons are also provided. The device then initiates a continuous loop where it records incoming data, fits systems models based on machine learning, calculates prediction error, and identifies whether the system is unpredictable.

When the device of the disclosed and claimed concept is initialized and starts recording data, two parallel modeling paths are executed. The first path is called "Frequent Fast Models", which involves training relatively non-complex model types (for example a shallow neural network with pre-defined architecture) until an acceptable level of accuracy is achieved. At this point, the device of the disclosed and claimed concept begins predicting future data points based on this non-complex trained model, and it alerts the user to system anomalies when its predictions deviate from observations based at least in part upon probabilities of the observed deviations through statistical process control. The prediction deviation alarms are based on statistical process control of the prediction errors. This minimizes the probability of false alarms. After the non-complex model has been trained, a "Periodic Robust Model" path is optionally initiated in the background. In either path, the improved device of the disclosed and claimed concept simultaneously creates many parallel competing models which evolve with time. The winning model is always the one that gets used for either path. The winning model may change with each additional time step. More robust models are trained in this path, for example by using tuning grids to search for optimal model architectures and hyper-parameter values. Once a robust model is trained such that it results in improvement over the initial model, the robust model replaces the initial model.

An embodiment of the disclosed and claimed concept optionally includes separating the intrinsic methodology and software for the core functionality from the sensor inputs and interface such that it could be embedded in other data collection and data acquisition systems. This could be in the form of a physical module with or without the LCD screen interface.

The device of the disclosed and claimed concept includes a portable data acquisition and management system with user interface. The device is highly advantageous in its autonomous real-time application of analytics, providing anomaly detection, diagnostics, prognostics, and optimization capability without requiring subject matter expertise on the monitored system. The analytic methodology of the device is also system-agnostic, such that it can be applied to a large diversity of system types without modification to the device's hardware or software.

Machine learning is advantageously performed by the analytics engine. Advantageous aspects include the parallel training of multiple (i.e., 10 or more) diverse machine learning algorithms, and autonomously selecting the best model for the system being monitored. The process includes periodic background training of more robust models, including searches for optimal architectures and hyper-parameter values. The device of the disclosed and claimed concept autonomously trains, manages, and implements these numerous models without user input and without the requirement of user expertise in machine learning or of the system being monitored.

Autonomy of the overall process is also a significant advantage. This autonomy includes the acquisition and management of sensor data, the generation and management of predictive models, as well as the generation of system diagnostic, prognostic, and optimization insights. The user need only attach sensors to the system of interest, or connect to a server of existing or live system data, and turn the device of the disclosed and claimed concept, at which point it begins learning the system, training system models, and monitoring the system.

An additional advantage is the application of statistical process control techniques in the management of models, including logic for anomaly detection, diagnostics, prognostics, and optimization. These techniques reduce false alarms, can detect slow moving transients or system drift, and provide the user with a confidence level of the system status.

Accordingly, an aspect of the disclosed and claimed concept is to provide an improved device that is capable of monitoring a system and generating an alert or taking action in certain predefined circumstances, such as when the system becomes unpredictable or is otherwise undesirable for one reason or another.

Another aspect of the disclosed and claimed concept is to provide an improved method of monitoring such a system and for generating an alert or taking action when the behavior of the system becomes unpredictable or otherwise undesirable.

Another aspect of the disclosed and claimed concept is to provide such an improved device and method that are advantageously capable of autonomously learning the normal behavior of the system and of generating an alert or other output when the behavior of the system become unpredictable or otherwise undesirable.

Another aspect of the disclosed and claimed concept is to provide such an improved device and method where such autonomous learning does not require any prior knowledge about the system and which is capable of being connected with any type of a system whose operation can be observed, such as via instrumentation.

Another aspect of the disclosed and claimed concept is to provide such an improved device and method which can be removed from one system and can be subsequently reapplied to a completely different new system in which such autonomous learning is repeated for the new system, or, if put onto a similar system, can be used to predict that system in an accelerated fashion using a preexisting learned model and data from the previous system.

Accordingly, an aspect of the disclosed and claimed concept is to provide an improved device that is structured to monitor a system. The device can be generally stated as including a processor apparatus that can be generally stated as including a processor and a storage, an input apparatus that can be generally stated as including a number of input ports that are structured to receive a number of sets of signals that are representative of a number of operational parameters of the system and to provide them as input signals to the processor apparatus, an output apparatus that is structured to receive output signals from the processor apparatus, the storage having stored therein a number of routines which, when executed on the processor, cause the device to perform a number of operations that can be generally stated as including performing a learning procedure that can be generally stated as including receiving on a subset of the number of input ports one or more series of first learning signals that are representative of one or more operational parameters of the number of operational parameters, receiving on another input port different from the subset a series of second learning signals that are representative of another operational parameter of the number of operational parameters, subjecting at least a representation of at least a subset of the one or more series of first learning signals and the series of second learning signals to at least a first machine learning algorithm to obtain at least a first model of the system, at each time step in a series of time steps during operation of the system, performing an operational procedure that can be generally stated as including receiving on each of the subset of the number of input ports a first operational signal that is representative of one of the one or more operational parameters, receiving on the another input port a second operational signal that is representative of the another operational parameter, inputting at least a representation of each first operational signal into the at least first model to obtain from the at least first model a predicted operational signal that is a prediction of the another operational parameter, obtaining an error signal based at least in part upon a difference between the predicted operational signal and the second operational signal, subjecting the error signal to a statistical process control algorithm, and outputting an alarm when the statistical process control algorithm determines that the error signal exceeds a predetermined threshold. Such a threshold may be self-determined, wherein the device determines the threshold instead of the user. Such a predetermined threshold may also be a pattern of errors and not just a threshold of error.

Another aspect of the disclosed can claimed concept is to provide an improved method of employing a device to monitor a system, the device having a processor apparatus having a processor and a storage, an input apparatus having a number of input ports that receive a number of sets of signals that are representative of a number of operational parameters of the system and provide them as input signals to the processor apparatus, an output apparatus being structured to receive output signals from the processor apparatus, the storage having stored therein a number of routines which, when executed on the processor, cause the device to perform a number of operations that can be generally stated as including performing a learning procedure that can be generally stated as including receiving on a subset of the number of input ports one or more series of first learning signals that are representative of one or more operational parameters of the number of operational parameters, receiving on another input port different from the subset a series of second learning signals that are representative of another operational parameter of the number of operational parameters, subjecting at least a representation of at least a subset of the one or more series of first learning signals and the series of second learning signals to at least a first machine learning algorithm to obtain at least a first model of the system, at each time step in a series of time steps during operation of the system, performing an operational procedure that can be generally stated as including receiving on each of the subset of the number of input ports a first operational signal that is representative of one of the one or more operational parameters, receiving on the another input port a second operational signal that is representative of the another operational parameter, inputting at least a representation of each first operational signal into the at least first model to obtain from the at least first model a predicted operational signal that is a prediction of the another operational parameter, obtaining an error signal based at least in part upon a difference between the predicted operational signal and the second operational signal, subjecting the error signal to a statistical process control algorithm, and outputting an alarm when the statistical process control algorithm determines that the error signal exceeds a predetermined threshold.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figures 1, 1A:
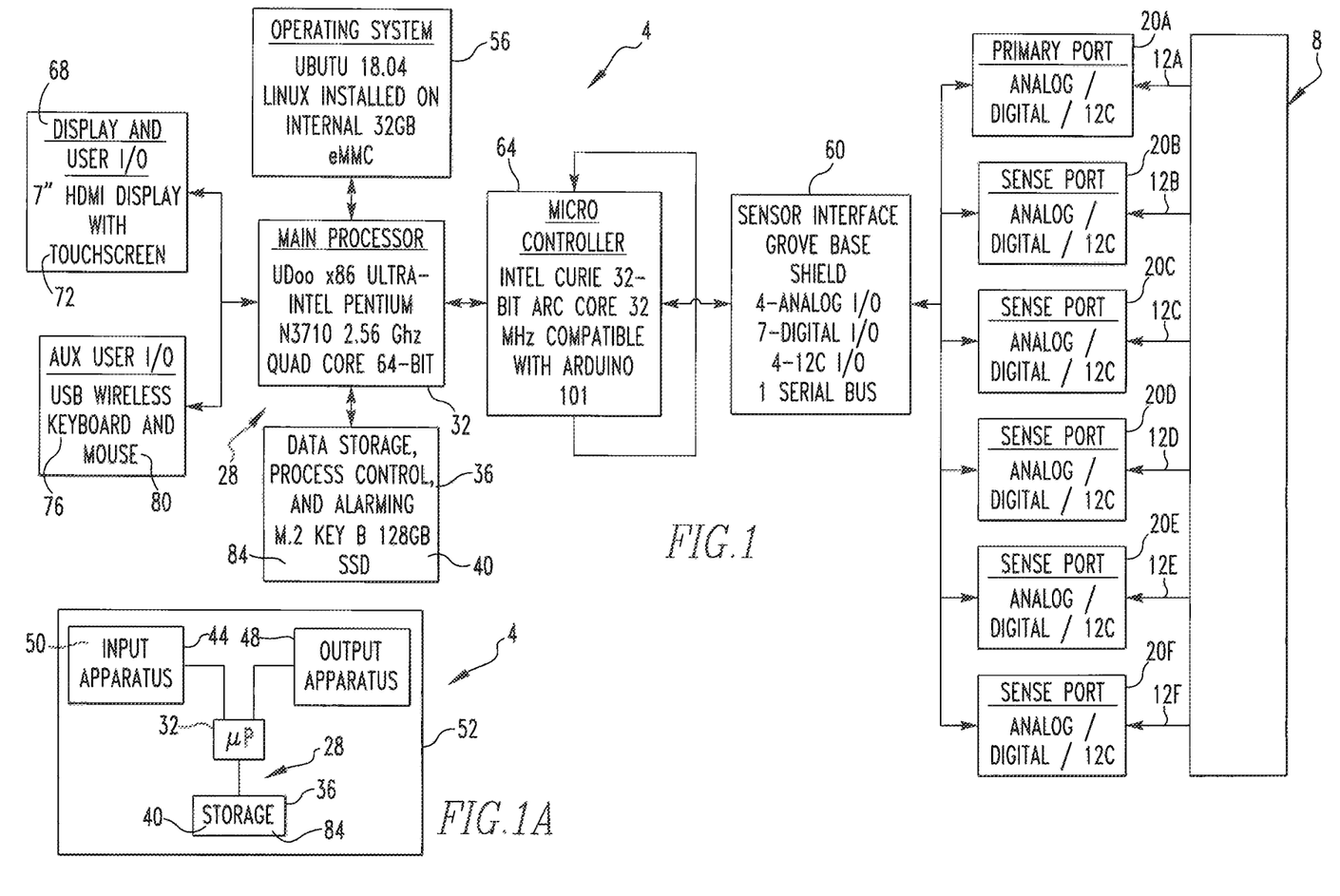
FIG. 1 is a schematic depiction of an improved device in accordance with the disclosed and claimed concept that is usable for monitoring a system to which the device is connected.
FIG. 1A is another schematic depiction of the device of FIG. 1.
Figure 2A:
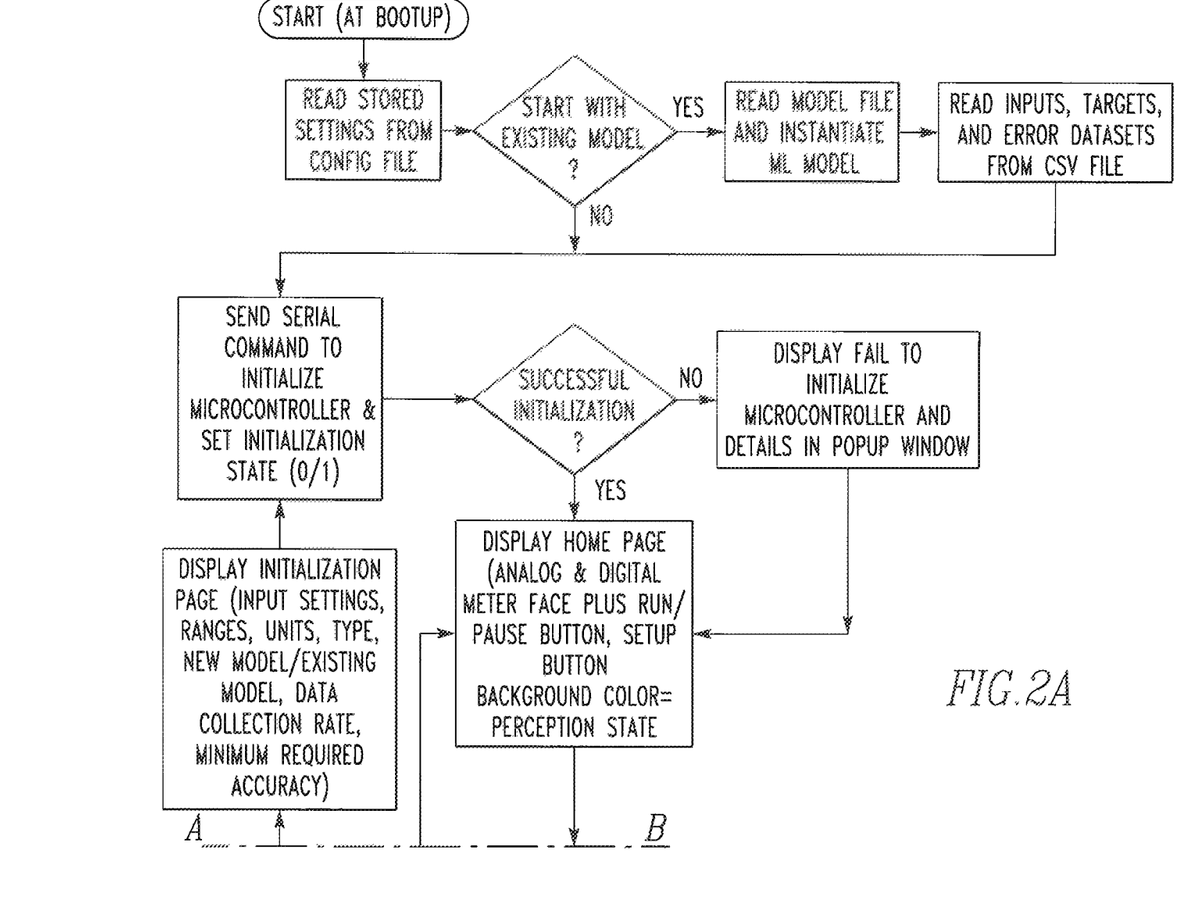
FIGS. 2A and 2B are an exemplary depiction of an implementation of the software architecture that is deployed and is usable on the device of FIG. 1.
Figure 2B:
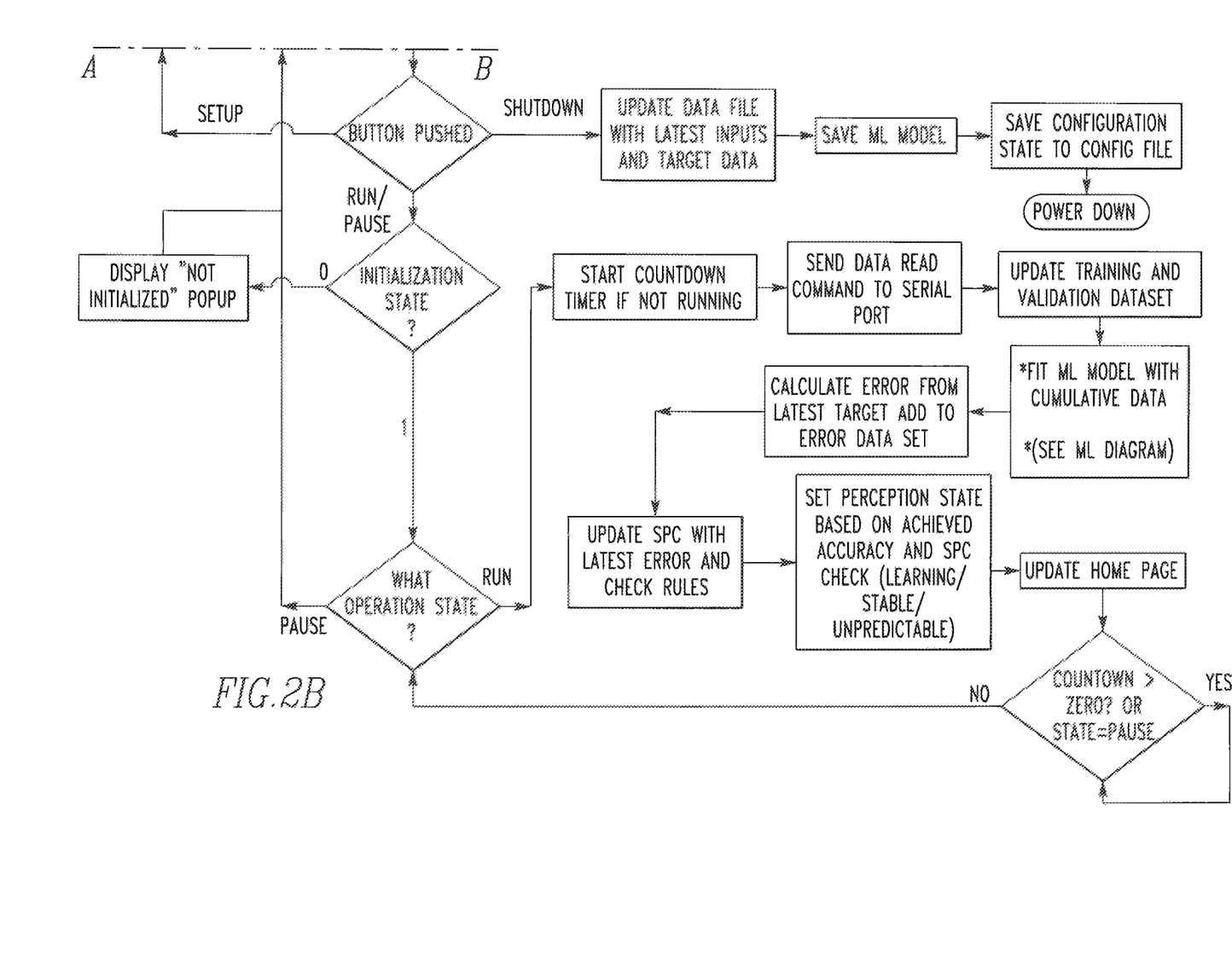
Figure 3:
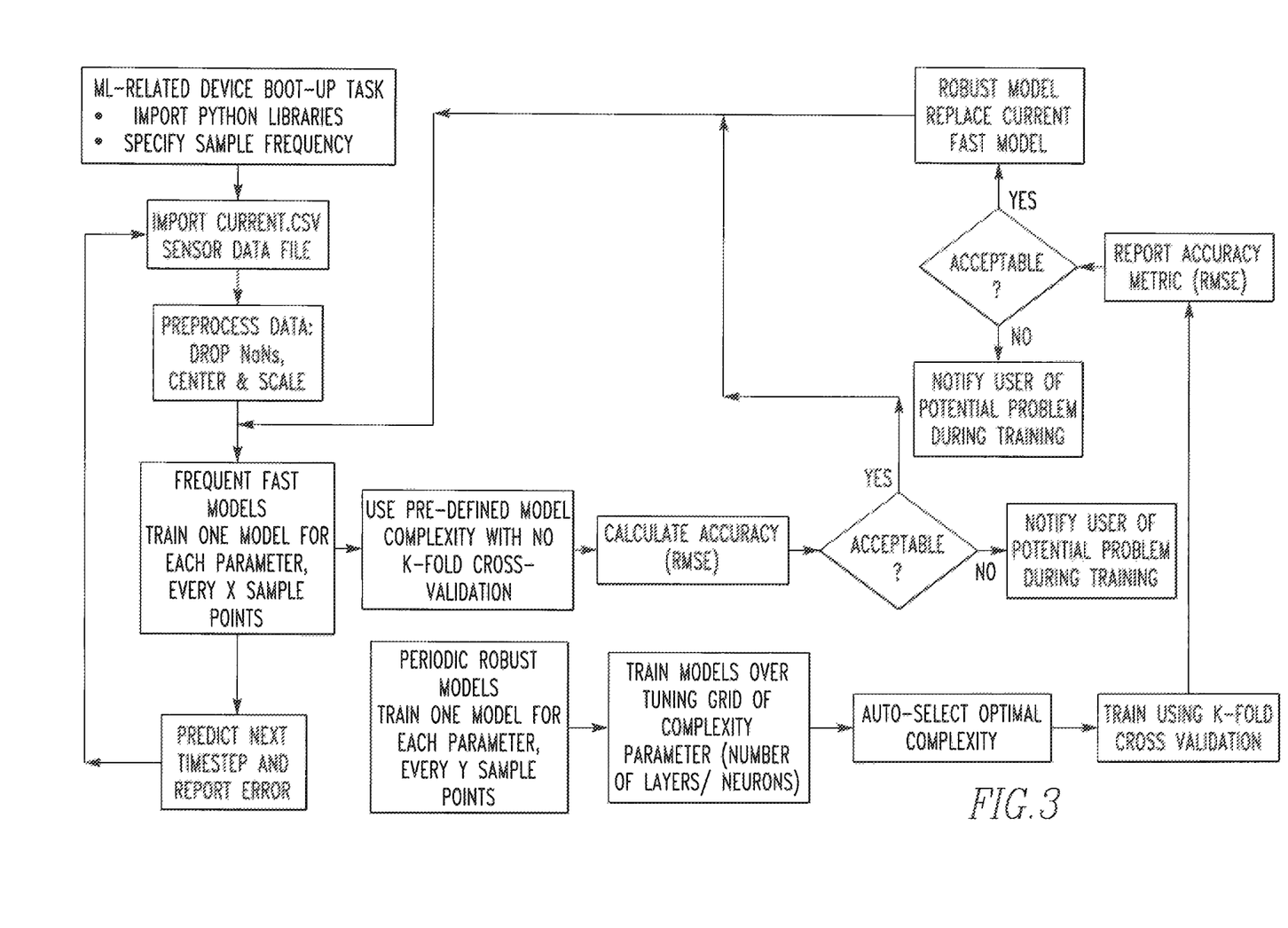
FIG. 3 is a schematic depiction of an exemplary implementation of an improved modeling operation that is performed on the device of FIG. 1.

An improved device 4 in accordance with the disclosed and claimed concept is depicted in FIGS. 1 and 1A. The device 4 is structured to be electrically connected with a system 8 via instrumentation in the form of sensors or other instrumentation that detects or observes a number of operational parameters of the system. As employed herein, the expression "a number of" and variations thereof shall refer broadly to any non-zero quantity, including a quantity of one.

As can be understood from FIG. 1A, the device 4 can be broadly characterized as including a processor apparatus 28 that includes a processor 32 and a storage 36. The processor 32 can be any of a wide variety of processors, including microprocessors and the like without limitation. The storage 36 can be any of a wide variety of storage devices including RAM, ROM, EPROM, FLASH, and the like without limitation and can operate as a non-transitory storage medium. The storage 36 has a number of routines 40 stored therein in the form of instructions which, when executed on the processor 32, cause the device 4 to perform various operations such are set forth elsewhere herein. The device 4 further includes an input apparatus 44 that receives signals that are representative of the operational parameters of the system 8, along with other signals, and provides these signals as input signals to the processor 32. The device 4 further includes an output apparatus 48 that includes a number of output ports 50 that receive output signals from the processor 32 and that provide outputs to various other devices, which can include, by way of example and without limitation, an enterprise data system or any of a wide variety of other devices. The processor apparatus 28, the input apparatus 44, and the output apparatus 48 are depicted in FIG. 1A as all being situated upon or within a housing 52 or other type of support, although it is understood that certain components of the input apparatus 44 or the output apparatus 48, or both, might be separate from the housing 52 depending upon the needs of the particular application.

As can further be seen in FIG. 1, the system 8 can be said to include a primary output channel that is indicated at the numeral 12A and a set of secondary output channels that can be said to be indicated at the numerals 12B, 12C, 12D, 12E, and 12F, which may be collectively or individually referred to herein with the numeral 12. The output channels 12 may be a part of the system 8 itself or may be a part of instrumentation that has been applied to the system 8. The output channels 12 typically will include an output channel that is of primary interest, and which would be representative of an operational parameter of the system 8 that is of primary interest. The system 8 would additionally include other operational parameters, and signals that are representative of such additional operational parameters would be output on the secondary output channels 12B, 12C, 12D, 12E, and/or 12F, it being noted that fewer than all of these output channels might exist on any given system.

In an example given hereinbefore, the system 8 can a pump, and the pump's shaft vibration might be the operational parameter of primary interest. In such a situation, an output signal that is representative of the pump shaft vibration would be output from the system 8 on the primary output channel 12A. Other operational parameters of the system 8, when in the exemplary form of the aforementioned pump, might include, by way of example, motor current, oil temperature, fluid flow rate, and fluid pressure. These four operational parameters might be measured by various instrumentation applied to the system 8, which instrumentation would provide output signals on the secondary output channels 12B, 12C, 12D, and 12E, by way of example, meaning that the secondary output channel 12F might not exist in the given exemplary scenario. However, the secondary output channel 12F might exist if the system 8 is something other than a pump, or if an additional operational parameter of the pump might desirably be provided as an additional input to the device 4. It is reiterated that the output channels 12 might actually be a part of the system 8 itself, such as if a pump includes its own pressure gauge, or might be instrumentation that is applied to the system 8, such as with a piezoelectric sensor being applied to the pump in order to detect vibrations of the pump shaft.

As can further be understood from FIG. 1, the device 4 includes a primary input port that is indicated at the numeral 20A and a number of secondary input ports that are indicated at the numerals 20B, 20C, 20D, 20E, and 20F, all of which may be collectively or individually referred to herein with the numeral 20. The input ports 20 are connected with the output channels 12 in order that the various operational parameters of the system 8 are input to the device 4. The input ports 20 can be any of a wide variety of input devices and each may be analog in nature or digital in nature, by way of example. For instance, the primary input port 20A might be a conventional set of terminals to which wires would be attached such that the primary input port 20A is analog in nature and detects a voltage. The secondary input port 20B might, for instance, be an RS232 digital port, and the secondary port 20C might be an optical port, by way of further example. In like fashion, the secondary input ports 20D, 20E, and 20F can be any of a wide variety of input devices that are configured to detect inputs of various types and which may be selected in order to increase the versatility of the device 4 by making the device 4 capable of being connected with a wide variety of different types of instrumentation. Alternatively, the input ports 20 could be selected in order to enable connection with a particular type of system and to therefore be of a particular configuration to achieve that purpose.

It is also understood that the primary input port 20A might not necessarily be a particular one of the ports 20, but might simply be designated as such. By way of example, and in the example of the system 8 being a pump, it may have been determined that the operational parameter of interest is the vibration of the pump shaft, meaning that this is the operational parameter of the system 8 that has been determined to be the one that will be indicative of instability of the system 8 or of any other type of undesirable situation with the system 8. Continuing with the example, if the vibration of the pump shaft is detected by a piezoelectric sensor whose output is connected with a charge amplifier, the output of the charge amplifier may be analog in nature, and perhaps in the particular embodiment of the device 4 the most readily available input port 20 that is analog in nature and that could accept the input from the aforementioned charge amplifier might be the input port 20E. In such a situation, the input port 20E would be designated as the primary input port, and the other input ports might be indicated as being secondary in nature.

Depending upon the nature of the system 8, the system 8 might have two or more operational parameters that are considered to be of primary importance, such as if any one or more of these operational parameters might individually or in combination indicate the existence of an unstable or other undesirable condition. It is also noted that the routines 40 might be configured that any input on any of the input ports 20 might trigger an alarm if it is sufficiently out of the expected range of values for that input port that it is indicative of instability of the system 8. Other variations will be apparent, it being reiterated that the input ports 20 can be of any nature without limitation, and it is also noted that the input ports 20 may be greater or lesser in quantity than those expressly set forth herein without departing from the spirit of the instant disclosure. It is also understood that the input ports 20 can have any one or more of a variety of input connections such as terminals, optical inputs, RJ45 connectors, Universal Serial Bus (USB) connectors, and the like without limitation, in any combination, which enhance the versatility of the device 4 by permitting numerous different types of instrumentation to be electrically connected with the device 4.

The device 4 additionally includes a sensor interface 60 that communicates directly with the input ports 20 and further includes a microcontroller 64 that interfaces between the sensor interface 60 and the processor 32. The sensor interface 60 is the hardware to which sensors physically connect into the device (plugs, ports, connectors, etc.), and the microcontroller 64 is a programmable circuit board used to import and process the sensor signals. It is understood, however, that other physical hardware potentially can accomplishes the same thing, and these aspects of the depicted exemplary embodiment are non-limiting.

The device 4 additionally includes an operating system 56 which, in the depicted exemplary embodiment, is a LINUX operating system. The operating system 56 is stored in the storage 36 or might be stored in another storage medium that is resident on the device 4.

The device 4 further includes a visual display 68 and a touch-sensitive overlay 72 that together form a touchscreen. The visual display 60 would be considered to be a part of the output apparatus 48 and is connected with one of the output ports 50, while the touch-sensitive overlay 72 would be considered to be a part of the input apparatus 44. The input ports 20 are likewise considered to be part of the input apparatus 44. The device 4 further includes a keyboard 76 and a mouse 80 or other type of pointing device that are both a part of the input apparatus 44. The touchscreen, keyboard 76, and mouse 80 together are user interface devices that are operable by a user to provide inputs to the device 4 and to ascertain outputs from the device 4, and it is understood that additional and/or alternative user input and output devices and other devices might be provided on the device 4 within the spirit of the instant disclosure.

The device 4 is operated in two phases in operations that are performed by the routines 40 that are stored in the storage 36. The first phase can be referred to as a learning phase, and the second phase can be referred to as an operational phase. In the learning phase, the routines 40 utilize certain inputs that are received via the input ports 20 in order to develop a model 84 of the system 8 that is stored in the storage 36. The model 84 might be in any of a variety of forms and, in the depicted exemplary embodiment, is in the form of a multi-coefficient polynomial, by way of example. Once the model 84 has been developed in the learning phase and stored in the storage 36, the model 84 is thereafter employed by the routines 40 during the operational phase to determine whether the behavior of the system 8 is unstable or is otherwise undesirable, in which case an alarm or other type of output is generated by the output apparatus 48.

During the learning phase, a series of signals from the various input ports 20 are received and stored in the storage 36, perhaps 1000 measurements from each such input port 20 for instance, that are recorded at intervals of, for instance, one measurement per second. These data values can be referred to as a series of learning signals. A first subset of the series of learning signals can be referred to as a learning data set and which are employed in order to develop and calculate the model 84. A second subset of the series of learning signals can be referred to as a validation data set and which are employed to determine the accuracy of the model 84.

For example, of the series of 1000 data values that are recorded from each of the input ports 20 that are connected with the system 8 and that reflect an operational parameter of the system 8, perhaps 800 might be used as the learning data set and employed in order to develop the model 84, with the remaining 200 data values being used as the valuation data set which is input to the model 84 in order to determine a degree of accuracy for the model 84.

The exemplary 800 data values of the learning data set that were detected from any particular input port 20 are normalized in any of a variety of fashions in order to result in scalar and/or vector data set that is without regard to whether the signal that was received by the particular input port 20 was digital or analog, and without regard to whether the signal that was received on one of the input ports 20 was greater in magnitude than another signal that was received on another input port 20. Such normalization can be performed on the learning data set for each input port 20 by calculating a mean and a standard deviation for the set of data values and by dividing the mean by the standard deviation to result in a standard normal distribution which itself is centered on zero and has a standard deviation of 1.0. The result of this normalization is to obtain a standard normal distribution for the learning data set from each input port 20 which, in the depicted exemplary embodiment, would be a total of six standard normal distributions one for each of the series of signals that was detected at each of the primary input port 20A and the secondary input ports 20B, 20C, 20D, 20E, and 20F, assuming that all six of the input ports 20 were connected with output channels 12 from the system 8. It is understood that other normalization methodologies may be employed without departing from the spirit of the instant disclosure.

The routines 40 include a plurality of different types of classes of machine learning algorithms such as have been the subject of published papers and the like and which are generally known in the relevant art. The exemplary embodiment employs a library of machine learning algorithms whose names might include, for example and without limitation, artificial neural networks, support vector machines, tree-based models, and neighbor-based models, by way of example and without limitation. It is understood that these named machine learning algorithms are exemplary, and it is further understood that the library of such machine learning algorithms can be considered to be among the set of routines 40 and includes fifteen or twenty or more such machine learning algorithms, all of which are employed to develop candidate models, one of which is selected by the routines 40 as the actual model 84.

The various standard normal distributions (six in the depicted exemplary embodiment) of data are then input into each of the machine learning algorithms in the library, and each machine learning algorithm outputs a candidate model. The validation data set is then input into each candidate model in order to determine the accuracy of each such candidate model.

More particularly, and as noted hereinbefore, one of the operational parameters of the system 8 is considered to be of primary interest and is detected on what has been designated as the primary input port 20A. As such, the data values of the validation data set are input into each candidate model in a fashion that is intended to evaluate how well each candidate model predicts the values of operational parameter that was of primary interest. As such, for each data step in the validation data set, the various data values that were recorded by the secondary input ports 20B, 20C, 20D, 20E, and 20F, for example, are input into each candidate model and a corresponding predicted value for the operational parameter of primary interest from the input port 20A is generated by the candidate model. Each such predicted value for the input from the input port 20A is netted with the corresponding actual measured value from the input port 20A to result in a difference value. The difference values are then squared, and the squares are then summed, and a square root is taken of the sum in order to result in a Route Mean Squared Error (RMSE) for that candidate model. The various RSME values for the various candidate models are then compared with one another, and the candidate model having the relatively lowest RSME value is then selected as the model 84, and the model is stored in the storage 36.

Since the model 84 was calculated based upon only a subset of the series of learning signals, i.e., it was based upon only the learning data set, the model 84 may optionally be recalculated based upon the entire series of learning signals, i.e., the learning data set and the validation set together to result in a recalculated or updated version of the model which is then stored as the model 84 in the storage 36. That is, the machine learning algorithm that generated the candidate model that was selected as the model 84 on the basis of having the relatively lowest RMSE value can optionally have the entire series of learning signals input thereto in order to generate a more comprehensive model 84 that is then stored in the storage 36 and is used during the operational phase by the routines 40.

During the learning phase, the device 4 determines for itself whether it is sufficiently trained, meaning that the routines 40 make such a decision. In order to do this, the device 4 will have a nominal error threshold, such as, and by way of example, a standard error of 5%. Such a nominal error threshold represents the degree of accuracy of the model that must be achieved before the model 84 is relied upon to enable the routines 40 to cause the device 4 to perform its operational phase. The "standard error" of the model is the standard deviation of a certain number of error values that have been calculated by netting the observed signal received at the primary input port 20A with the predicted value of that signal that is output by the model 84. Such error values are calculated a predetermined number of times, such as 1000 error values or other appropriate number. Such standard error is calculated by dividing the aforementioned standard deviation of the error values by the mean of these error values, which results in the relative standard error of the model 84. Once the standard error or the relative standard error, whichever is chosen to be employed, is below a predetermined threshold, i.e., 10% by way of example, which means that the predicted values are within 10% of the observed values on the whole, the routines 40 make a determination that the model 84 has been sufficiently trained. The routines 40 thus terminate the training phase and store the model 84 in the storage 36 for deployment and use during the operational phase that is conducted by the routines 40.

Once the model 84 is finalized and selected from among the other candidate models, the model 84 is effectively frozen, meaning that the polynomial coefficients are fixed if the model 84 is in the form of a polynomial. It is noted that the routines 40 optionally can be configured to periodically evaluate whether model 84 continues to be properly trained and whether it continues to be the best model that is available. In this regard, the routines 40 can periodically perform a retraining or reevaluation operation in the background to determine whether any model generated by any other algorithm, whether or not previously employed, generates a candidate model with a better, i.e., lower, RSME. In this regard, the routines 40 may employ all of the machine learning algorithms that had been employed in the past and potentially can additionally perform searching among online databases and elsewhere for additional machine learning algorithms that have become available and that potentially had previously not been evaluated for purpose of developing a candidate model. For instance, machine learning languages may have been developed since a learning phase of the device or had been enhanced or improved, etc. If in the optional relearning phase a candidate model is determined to have a better RSME than the model 84, the candidate model can replace the model 84 in the storage 36. It is understood that the machine learning algorithms are considered to be a part of the routines 40.

During the operational phase, various signals that are received from the secondary input ports 20B, 20C, 20D, 20E, and 20F are inputs into the model 84 for the purpose of using those secondary operational parameters in order to generate from the model 84 a predicted value for the operational parameter of primary interest, i.e., a prediction of the value of the signal that is received at the primary input ports 20A. Such an operation is performed at each of a series of time steps which may be, for instance, once per second or any other appropriate frequency that is desired. At each time step, the various inputs from the secondary input ports 20B, 20C, 20D, 20E, and 20F are input into the model 84, it being reiterated that such signals are representative of the various secondary operational parameters of the system 8. The model 84 then generates a predicted value for the operational parameter of primary interest which, again, is a prediction of the value of the signal that is received at the primary input ports 20A.

In this regard, it is noted that during the learning phase the various inputs from the various input ports 20 had been subjected to a normalization operation that may have involved standard deviation and mean calculations in order to generate a scalar and/or vector data set that was input into the machine learning algorithm that generated the model 84. It is therefore understood that it may be necessary at each time step during the operational phase to perform the same normalization operations on the signals that are received from the input ports 20 in order for the model 84 to make sense of them. Alternatively, once a candidate model that was generated by a particular machine learning algorithm has been selected as being the most accurate, the model 84 might simply be recalculated using the same machine learning algorithm, except using the actual raw, non-normalized values of the series of learning signals that were detected at the input ports 20. In any event, processing is performed as needed on the signals that are received during the operational phase from the input ports 20, or the model 84 is reformulated with non-normalized values, such that at each of the aforementioned time steps during the operation phase, inputs from the input ports 20 can be input to the model 84 in order to obtain from the model 84 a predicted value for the input that is received at the primary input port 20A.

This results in both a predicted value for the signal from the primary input port 20A and an actual, i.e., observed, value for the input that is received from the primary input port 20A. The two values, i.e., the predicted value and the observed value for the operational parameter of primary interest, are netted with one another to result in an error signal. The error signal is then input into a known statistical process control algorithm in order to determine when the system 8 is becoming unpredictable or is having a behavior that is undesirable. An exemplary known statistical process control algorithm might include individual moving range chart (I-MR), normal statistical process control limits, process capability assessment, and Analysis of Variance (ANOVA) Gauge Repeatability and Reproducibility (R&R)), by way of example and without limitation. It is understood that the known statistical process control algorithm is a part of the routines 40.

The routines 40 that employ the model 84 can detect various things. For instance, the routines 40 can detect whether the system 8 is unpredictable or unstable based upon the inputs that are received from the input ports 20 as applied to the model 84 and as analyzed by a statistical process control algorithm. In this regard, another threshold of error would be employed to determine whether the predicted values for the operational parameter of primary interest are sufficiently different than the actual observed values for the operational parameter of primary interest. In this regard, it is reiterated that the routines 40 can react to an unexpected or unusual value of any operational parameter of the system 8, as measured at the input ports 20, as an indication that the system 8 is unpredictable or unstable.

The routines 40 additionally can determine whether a relationship inside the system 8 is changing, such as if a part is wearing or if an anomaly such as a loose part has suddenly appeared. Additionally, it is possible that one or more meaningful aspects of the system 8 are un-metered or un-instrumented and thus not provided as inputs to the device 4, and it is possible that such missing input is important to be able to accurately predict the operational parameter of primary interest. If the routines 40 determine that an accurate model of the system 8 is unobtainable, this results in an output being provided to the output apparatus 48 that advises an operator that additional inputs or better inputs are required at the input ports 20 in order to accurately predict output. For instance, if no machine learning algorithm can seem to generate a candidate model that is sufficiently accurate to predict the operational parameter of primary interest, the routines 40 would trigger an output instructing that additional analysis of the various output channel 12 be performed in order to identify better output channels or new output channels from the system 8.

It thus can be seen that by applying the device 4 to the system 8, the operation of the system 8 can be observed without requiring a person with skill regarding the particular system 8 to constantly or even regularly evaluate the operational parameters of the system 8. That is, the device 4 advantageously autonomously learns the normal behavior of the system 8 and generates an output that is sent to the output apparatus 48 in response to a determination that the operation of the system 8 has become unpredictable. The output can be in the nature of a warning, or it can be an instruction and/or an electronic signal to cease operations of the system 8 in a safe fashion, or both, by way of example.

Figure 4:
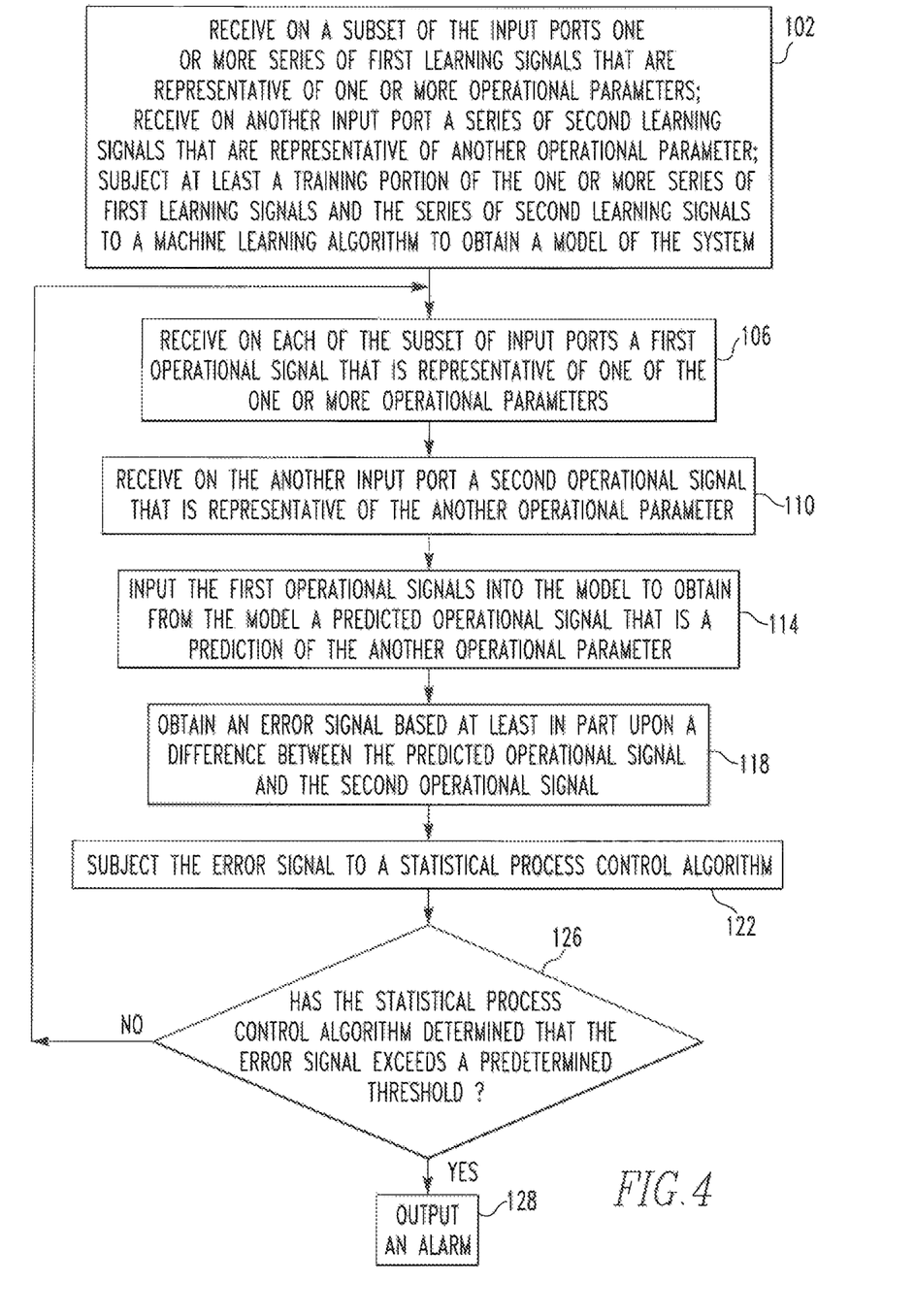
FIG. 4 is an exemplary flowchart depicting certain aspects of an improved method in accordance with the disclosed and claimed concept.

FIG. 4 depicts in a flowchart certain aspects of an improved method in accordance with the disclosed and claimed concept. Processing can begin, as at 102, with a learning operation. As noted, the routines 40 cause the device 4 to autonomously learn the normal behavior of the system 8, and this is done by, for instance, receiving on a subset of the input ports 20 one or more series of first learning signals that are representative of one or more operational parameters of the system 8. That is, each input port 20 will receive its own series of first learning signals. The learning operation further includes receiving at the same time on another, i.e., different, input port 20 a series of second learning signals that are representative of another operational parameter which, in the depicted exemplary embodiment, is the operational parameter of primary interest. The learning operation can additionally include the subjecting of at least a training portion of the one or more series of first learning signals and at least a training portion of the series of second learning signals to a machine learning algorithm to obtain a model of the system. As noted hereinbefore, the routines 40 can optionally subject the training portions of the first and second learning signals to each of a plurality of different machine learning algorithms in order to obtain candidate models from each such machine learning algorithm, and the various candidate models can be evaluated using a verification portion of the first and second learning signals to obtain an RSME value for each such candidate model in order to identify and select the candidate model having the lowest RSME as being the model 84. As also noted hereinbefore, after the machine learning algorithm that has generated the best candidate model is identified, and this same machine learning algorithm can be employed to develop a more robust version of the model 84 by employing both the training and verification portions of the data together to develop a new version of the model 84. In this regard, the new version of the model 84 might simply employ the original data values for the first and second leaning signals rather than employing the normalized values thereof. As also noted hereinbefore, the routines 40 themselves determine when the model 84 is sufficiently accurate that the learning phase can ben be terminated and the operational phase can begin. For instance, the learning phase might initially include a number of series of 1000 learning signals that are then subjected to various machine learning algorithms to obtain candidate models that are then evaluated for accuracy. If none of the candidate algorithms meets the predetermined threshold for accuracy, or if too few of them meet the indicated predetermined threshold for accuracy, the process may be repeated with, for instance, new learning signals that include a number of series of data values that are 2000 in number or more, by way of further example.

Once the model 84 has been established and stored in the storage 36, processing by the routines 40 can continue, as at 106, with the receipt on each of the subset of input ports of a first operational signal that is representative of the one or more of the operational parameters. Such processing can also include, as at 110, at least substantially simultaneously receiving on the another input port 20 a second operational signal that is representative of the another operational parameter. For instance, the another operational parameter might be the operational parameter of primary interest. Processing can continue, as at 114, with the inputting of the first operational signals into the model 84 and obtaining from the model 84 a predicted operational signal that is a prediction of the another operational parameter.

Processing can then continue, as at 118, with the obtaining of an error signal that is based at least in part upon a difference between the predicted operational signal, which is a predicted value of the second operational signal, and the observed value of the second operational signal. Processing then continues by inputting this error signal into a known statistical process control algorithm, as at 122. It is then determined, as at 126, whether the statistical process control algorithm has determined that the error signal exceeds a predetermined threshold. If not, processing continues, as at 106, where the foregoing operational phase steps are repeated. If the error signal is determined at 126 to exceed the predetermined threshold, an output is generated in the form of an alarm or an instruction, as at 128, which is sent to the output apparatus 48.

It is understood that the operations indicated at 106, 110, 114, 118, 122, and 126 are performed at each of a series of time intervals during the operational phase of the device 4. The time intervals might be one second apart or other appropriate time interval apart, depending upon the needs of the particular application.

It is further understood that the routines 40 additionally advantageously permit further learning of normal system behavior in other fashions. For instance, in a certain situation where an alarm is generated, as at 128, a technician or other appropriate person might determine that the operation of the system 8 is nevertheless typical and is not a reason for concern, and the technician thus might provide a predetermined input to the routines 40 that is input via the input apparatus 44 which cancels the alarm that was generated at 128 and which instructs the model 84 to consider the operational parameters that resulted in the alarm at 128 to be normal and thus to not generate an alarm in the event of such a situation in the future. In other circumstances, the alarm 128 can be in the form of a signal that instructs the system 8 to cease operations. This can be an instruction of an immediate cessation or, depending upon the nature of the system 8, can be an instruction to cease operation when the system 8 is in a safe state, such as in the circumstance of a crane that would desirably not be halted in an unsafe condition. That is, while the alarm that is generated at 128 might be in the nature of an alarm that indicates to a technician that the system 8 should cease operations, it may also be an alarm that simply triggers the system 8 to stop operations as soon as practical.

It thus can be seen that the advantageous device 4 can be connected with the system 8 and can autonomously learn the normal behavior of the system 8, and once the learning phase is determined by the device 4 to be completed, the device 4 can automatically enter an operational phase. During the operational phase, if the device 4 detects that the system 8 is becoming unpredictable, the device 4 can send an instruction that indicates that the system 8 should be shut down. The device 4 advantageously employs a plurality of machine learning algorithms that are used in order to identify the best machine learning algorithm, i.e., the one whose candidate model most closely predicts an operational parameter of primary interest based upon other operational parameters of the system 8. The device 4 is operable with any type of prior knowledge of the system 8 and can use any type of input in order to generate the model 84 and to perform its operations during the operational phase. Moreover, the device 4 can be removed from the system 8 and, after resetting, replaced on a different system 8 and, once activated, will again perform a learning operation on the new system 8, will choose the best model 84 that characterizes the new system 8, and will then start an operational phase wherein it will monitor the behavior of the new system 8 and will output an alarm when the new system 8 becomes unpredictable or otherwise undesirable. Other advantages will be apparent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A device structured to monitor a system, the device comprising:
   a processor apparatus comprising a processor and a storage;
   an input apparatus comprising a number of input ports that are structured to receive a number of sets of signals that are representative of a number of operational parameters of the system and to provide them as input signals to the processor apparatus;
   an output apparatus that is structured to receive output signals from the processor apparatus;
   the storage having stored therein a number of routines which, when executed on the processor, cause the device to perform a number of operations comprising:
   performing a learning procedure comprising:

receiving on a subset of the number of input ports one or more series of first learning signals that are representative of one or more operational parameters of the number of operational parameters;

receiving on another input port different from the subset a series of second learning signals that are representative of another operational parameter of the number of operational parameters, wherein the another operational parameter is an operational parameter of primary interest, and wherein the another operational parameter is indicative of a stability of the system;

subjecting at least a representation of at least a subset of the one or more series of first learning signals and the series of second learning signals to at least a first machine learning algorithm to obtain at least a first model of the system;

at each time step in a series of time steps during operation of the system, performing an operational procedure comprising:

receiving on each of the subset of the number of input ports a first operational signal that is representative of one of the one or more operational parameters;

receiving on the another input port a second operational signal that is representative of the another operational parameter;

inputting at least a representation of each first operational signal into the at least first model to obtain from the at least first model a predicted operational signal that is a prediction of the another operational parameter;

obtaining an error signal based at least in part upon a difference between the predicted operational signal and the second operational signal;

subjecting the error signal to a first statistical process control algorithm, wherein the first statistical process control algorithm determines whether the predicted operational signal is sufficiently different than the second operational signal;

subjecting the first operational signals to a second statistical process control algorithm to detect any of the first operational signals outside a range of normal behavior;

outputting an alarm based on the first statistical process control algorithm determining that the error signal exceeds a predetermined threshold; and outputting another alarm based on the second statistical process control algorithm determining that any of the one or more operational parameters are outside the range of normal behavior.

2. The device of claim 1 wherein the operations further comprise:

statistically processing the one or more series of first learning signals to obtain one or more series of scalar and/or vector first learning signals; and subjecting the one or more series of scalar and/or vector first learning signals to the at least a first machine learning algorithm as the at least representation of the at least subset of the one or more series of first learning signals.

3. The device of claim 2 wherein the statistically processing of the one or more series of first learning signals comprises creating a standard normal distribution of the one or more series of first learning signals.

4. The device of claim 1 wherein the operations further comprise:

subjecting the at least representation of the at least subset of the one or more series of first learning signals and the series of second learning signals to at least a first machine learning algorithm by:

subjecting the at least representation of the at least a subset of the one or more series of first learning signals and the series of second learning signals to a first machine learning algorithm to obtain a first model of the system, and subjecting the at least representation of the at least a subset of the one or more series of first learning signals and the series of second learning signals to a second machine learning algorithm to obtain a second model of the system;

selecting one of the first model and the second model as being relatively more accurate than the other of the first model and the second model; and inputting the at least representation of each first operational signal into the one of the first model and the second model to obtain the predicted operational signal.

5. The device of claim 4 wherein the operations further comprise:

subjecting as the at least representation of the at least a subset of the one or more series of first learning signals and the series of second learning signals to the first machine learning algorithm a subset of each of the one or more series of first learning signals and a subset of the series of second learning signals to the first machine learning algorithm;

inputting to the first model a portion other than the subset of each of the one or more series of first learning signals to obtain from the first model a series of predicted second learning signals;

comparing the series of predicted second learning signals with a portion other than the subset of the series of second learning signals to obtain for the first model a corresponding error value;

subjecting as the at least representation of the at least a subset of the one or more series of first learning signals and the series of second learning signals to the second machine learning algorithm the subset of each of the one or more series of first learning signals and the subset of the series of second learning signals to the second machine learning algorithm;

inputting to the second model the portion other than the subset of each of the one or more series of first learning signals to obtain from the second model another series of predicted second learning signals;

comparing the another series of predicted second learning signals with the portion other than the subset of the series of second learning signals to obtain for the second model a corresponding error value; and selecting as the one of the first model and the second model whichever of the first model and the second model has a relatively lower corresponding error value.

6. The device of claim 5 wherein the operations further comprise obtaining a retrained model by subjecting at least a representation of the at least subset of the one or more series of first learning signals and the series of second learning signals and a portion of the one or more series of first learning signals and the series of second learning signals other than the at least subset to whichever of the first machine learning algorithm and the second machine learning algorithm from which the one of the first model and the second model was obtained.

7. The device of claim 1 wherein the performing of the learning procedure further comprises:
inputting at least a representation of at least a subset of the one or more series of first learning signals into the at least first model to obtain from the at least first model a series of predicted second learning signals;
obtaining a standard error of the at least first model based at least in part upon a difference between the series of predicted second learning signals and the series of second learning signals; and
terminating the learning procedure when the standard error is less than a predetermined threshold.

8. The device of claim 1 wherein the operations further comprise:
performing another learning procedure subsequent to the obtaining of the at least first model of the system by subjecting at least a portion of the first and second operational signals to the at least first machine learning algorithm to obtain an updated at least first model of the system; and
inputting at least a representation of each first operational signal into the at least first model by inputting the at least representation of each first operational signal into the updated at least first model to obtain the predicted operational signal.

9. The device of claim 1 wherein the outputting of the alarm was responsive to a particular first operational signal and a particular second operational signal, and wherein the operations further comprise:
receiving a predetermined input subsequent to the outputting of the alarm; and
responsive to the predetermined input, adjusting the at least first model to learn that at least one of the particular first operational signal and the particular second operational signal is typical and should no longer result in the outputting of the alarm.

10. The device of claim 1 wherein the outputting of the alarm includes outputting an instruction to freeze the system in a safe state.

11. A method of employing a device to monitor a system, the device having a processor apparatus having a processor and a storage, an input apparatus having a number of input ports that receive a number of sets of signals that are representative of a number of operational parameters of the system and provide them as input signals to the processor apparatus, an output apparatus that is structured to receive output signals from the processor apparatus, the storage having stored therein a number of routines which, when executed on the processor, cause the device to perform a number of operations comprising:
performing a learning procedure comprising:
receiving on a subset of the number of input ports one or more series of first learning signals that are representative of one or more operational parameters of the number of operational parameters;
receiving on another input port different from the subset a series of second learning signals that are representative of another operational parameter of the number of operational parameters;
subjecting at least a representation of at least a subset of the one or more series of first learning signals and the series of second learning signals to at least a first machine learning algorithm to obtain at least a first model of the system;
at each time step in a series of time steps during operation of the system, performing an operational procedure comprising:
receiving on each of the subset of the number of input ports a first operational signal that is representative of one of the one or more operational parameters;
receiving on the another input port a second operational signal that is representative of the another operational parameter, wherein the another operational parameter is an operational parameter of primary interest, and wherein the another operational parameter is indicative of a stability of the system;
inputting at least a representation of each first operational signal into the at least first model to obtain from the at least first model a predicted operational signal that is a prediction of the another operational parameter;
obtaining an error signal based at least in part upon a difference between the predicted operational signal and the second operational signal;
subjecting the error signal to a statistical process control algorithm, wherein the first statistical process control algorithm determines whether the predicted operational signal is sufficiently different than the second operational signal;
subjecting the first operational signals to a second statistical process control algorithm to detect any of the first operational signals outside a range of normal behavior;
outputting an alarm based on the statistical process control algorithm determining that the error signal exceeds a predetermined threshold; and
outputting another alarm based on the second statistical process control algorithm determining that any of the one or more operational parameters are outside the range of normal behavior.

12. The method of claim 11 further comprising:
statistically processing the one or more series of first learning signals to obtain one or more series of scalar and/or vector first learning signals; and
subjecting the one or more series of scalar and/or vector first learning signals to the at least a first machine learning algorithm as the at least representation of the at least subset of the one or more series of first learning signals.

13. The method of claim 11, further comprising:
subjecting the at least representation of the at least subset of the one or more series of first learning signals and the series of second learning signals to at least a first machine learning algorithm by:
subjecting the at least representation of the at least a subset of the one or more series of first learning signals and the series of second learning signals to a first machine learning algorithm to obtain a first model of the system, and
subjecting the at least representation of the at least a subset of the one or more series of first learning signals and the series of second learning signals to a second machine learning algorithm to obtain a second model of the system;
selecting one of the first model and the second model as being relatively more accurate than the other of the first model and the second model; and
inputting the at least representation of each first operational signal into the one of the first model and the second model to obtain the predicted operational signal.

14. The method of claim 13, further comprising:
subjecting as the at least representation of the at least a subset of the one or more series of first learning signals and the series of second learning signals to the first machine learning algorithm a subset of each of the one or more series of first learning signals and a subset of the series of second learning signals to the first machine learning algorithm;
inputting to the first model a portion other than the subset of each of the one or more series of first learning signals to obtain from the first model a series of predicted second learning signals;
comparing the series of predicted second learning signals with a portion other than the subset of the series of second learning signals to obtain for the first model a corresponding error value;
subjecting as the at least representation of the at least a subset of the one or more series of first learning signals and the series of second learning signals to the second machine learning algorithm the subset of each of the one or more series of first learning signals and the subset of the series of second learning signals to the second machine learning algorithm;
inputting to the second model the portion other than the subset of each of the one or more series of first learning signals to obtain from the second model another series of predicted second learning signals;
comparing the another series of predicted second learning signals with the portion other than the subset of the series of second learning signals to obtain for the second model a corresponding error value; and
selecting as the one of the first model and the second model whichever of the first model and the second model has a relatively lower corresponding error value.

15. The method of claim 14, further comprising obtaining a retrained model by subjecting at least a representation of the at least subset of the one or more series of first learning signals and the series of second learning signals and a portion of the one or more series of first learning signals and the series of second learning signals other than the at least subset to whichever of the first machine learning algorithm and the second machine learning algorithm from which the one of the first model and the second model was obtained.

16. The method of claim 11 wherein the performing of the learning procedure further comprises:
inputting at least a representation of at least a subset of the one or more series of first learning signals into the at least first model to obtain from the at least first model a series of predicted second learning signals;
obtaining a standard error of the at least first model based at least in part upon a difference between the series of predicted second learning signals and the series of second learning signals; and
terminating the learning procedure when the standard error is less than a predetermined threshold.

17. The method of claim 11, further comprising:
performing another learning procedure subsequent to the obtaining of the at least first model of the system by subjecting at least a portion of the first and second operational signals to the at least first machine learning algorithm to obtain an updated at least first model of the system; and
inputting at least a representation of each first operational signal into the at least first model by inputting the at least representation of each first operational signal into the updated at least first model to obtain the predicted operational signal.

18. The method of claim 11 wherein the outputting of the alarm was responsive to a particular first operational signal and a particular second operational signal, and further comprising:
receiving a predetermined input subsequent to the outputting of the alarm; and
responsive to the predetermined input, adjusting the at least first model to learn that at least one of the particular first operational signal and the particular second operational signal is typical and should no longer result in the outputting of the alarm.

19. The method of claim 11 wherein the outputting of the alarm includes outputting an instruction to freeze the system in a safe state.

20. A device structured to monitor a system, the device comprising:
a processor apparatus comprising a processor and a storage;
an input apparatus comprising a plurality of input ports that are structured to receive a plurality of signals indicative of a plurality of operational parameters of the system and to provide the plurality of signals as input signals to the processor apparatus;
an output apparatus that is structured to receive output signals from the processor apparatus;
the storage having stored therein a number of routines which, when executed on the processor, cause the device to:
perform a learning procedure comprising:
receiving, on secondary input ports of the plurality of input ports, a plurality of secondary learning signals that are indicative of a plurality of secondary operational parameters of the plurality of operational parameters;
receiving, on a primary input port of the plurality of input ports, primary learning signals indicative of a primary operational parameter of the plurality of operational parameters, wherein the primary operational parameter is indicative of a stability of the system, wherein the primary operational parameter is different than the plurality of secondary operational parameters, and wherein the input port is different than the secondary input ports;
inputting the primary learning signals and the plurality of secondary learning signals into a machine learning algorithm to obtain a model of the system;
at each time step in a series of time steps during operation of the system, performing an operational procedure comprising:
receiving on the primary input port a primary operational signal indicative of the primary operational parameter;
receiving on each secondary input port a secondary operational signal indicative of a secondary operational parameter of the plurality of secondary operational parameters;
inputting each secondary operational signal into the model to obtain from the model a predicted primary operational signal that is a prediction of the primary operational parameter;
obtaining an error signal based on a difference between the predicted primary operational signal and the primary operational signal;
inputting the error signal into a first statistical process control algorithm, wherein the first statistical process control algorithm is to determine whether the predicted primary operational signal is sufficiently different than the primary operational signal; and outputting an alarm based on the first statistical process control algorithm determining that the error signal exceeds a predetermined threshold.

* * * * *